Dec. 18, 1928.
D. D. SAPPENFIELD ET AL
1,696,127
WINDSHIELD HEATER
Filed Sept. 23, 1927
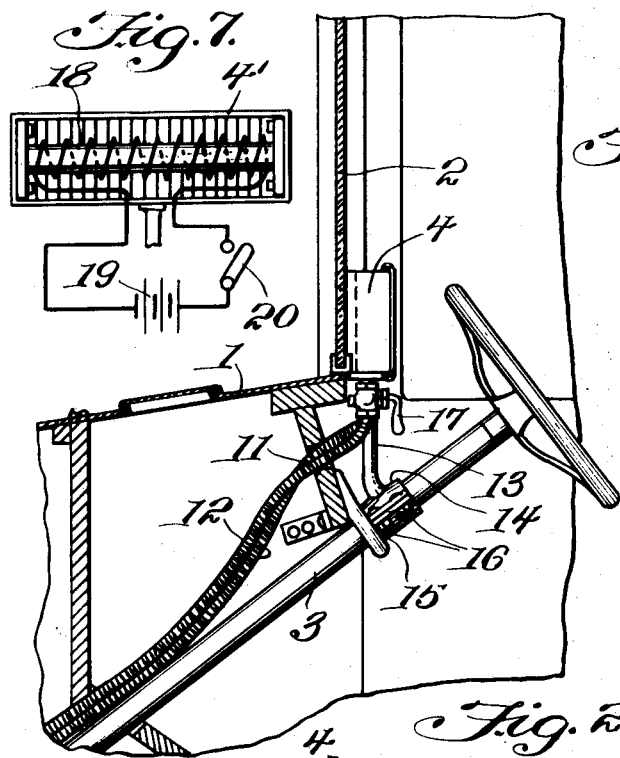
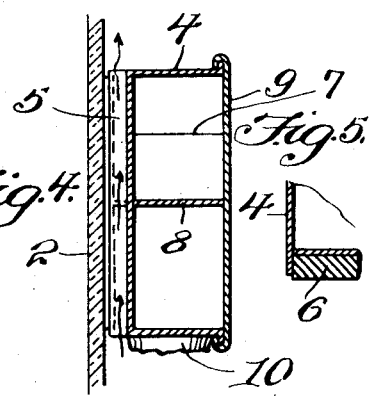
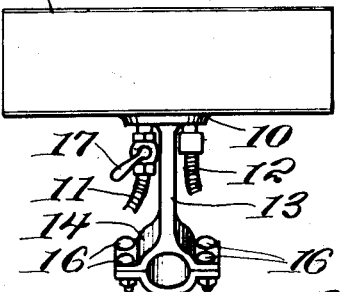
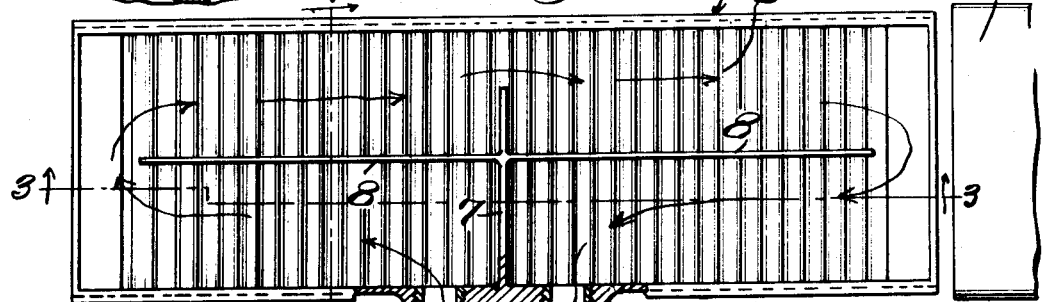
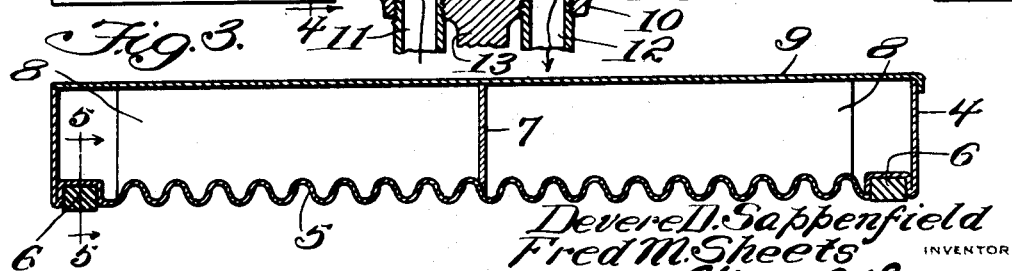

Patented Dec. 18, 1928.

1,696,127

UNITED STATES PATENT OFFICE.

DEVERE D. SAPPENFIELD AND FRED M. SHEETS, OF KANSAS CITY, KANSAS.

WINDSHIELD HEATER.

Application filed September 23, 1927. Serial No. 221,544.

Our present invention has reference to a simple and thoroughly effective device for heating the windshield of automobiles, street cars and like vehicles to prevent the accumulation of frost or snow thereon, so that the driver of the vehicle will have a clear vision of conditions ahead of his machine and thereby obviate any liability of accidents incident to an obscure windshield.

A further object is the provision of a heater for this purpose which includes a box-like member having a corrugated face to rest against the windshield and having compressible strips on such face to prevent injury to the wind shield, together with means for heating the interior of the body and thereby creating currents of hot air which will be directed over the entire surface of the windshield.

A still further object is the provision of a heater for windshields of automobiles or like vehicles in which means is provided for circulating heat throughout the entire body of the heater, means being provided for regulating or shutting off the heat from the body of the device, together with means for effectively supporting the device upon the windshield.

To the attainment of the above broadly stated objects and others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a detail sectional view through the forward portion of an automobile to illustrate the application of our improvement thereon.

Figure 2 is a front elevation of the body of the improvement with the face plate removed.

Figure 3 is a horizontal sectional view approximately on the line 3—3 of Figure 2, with the face plate or cover in place.

Figure 4 is a sectional view approximately on the line 4—4 of Figure 2, showing the device arranged against the windshield.

Figure 5 is a detail sectional view approximately on the line 5—5 of Figure 3.

Figure 6 is a face view of the improvement.

Figure 7 is an elevation of the improvement with the face or cover plate removed and the same provided with an electric heating coil as when the device is to be employed on railway or similar vehicles.

In Figure 1 of the drawings, we have illustrated our windshield heater applied to the windshield of an automobile. The forward portion of the automobile is indicated by the numeral 1, the windshield by the numeral 2 and the steering post column by the numeral 3. The metal box-like body 4 of the heater has its outer face corrugated vertically, as at 5, throughout the length thereof, and in the end grooves provided by these corrugations or if desired in other recesses there are arranged compressible strips 6. The strips are in direct contact with the inner face of the windshield 2 so that the improvement will inflict no injury to the said windshield.

Integrally formed with the box-like member 4 there is a central vertically directed partition 7 which extends from the bottom to a point a suitable distance from the top of the said member 4 and integrally formed with the said member 4 there are horizontal partitions 8 extending laterally from the partitions 7 and terminating adjacent to the ends of the hollow body 4. These partitions provide baffle plates so that the heat currents will be directed entirely around the interior of the body 4. The body 4 has its outer face closed by a removable cover plate 9.

The under face of the body, at the center thereof, is formed with a depending boss 10 and passing through openings in this boss at the opposite sides of the partition 7 there is a flexible heat inlet pipe 11 and a flexible heat outlet pipe 12. Between the pipes 11 and 12 the boss 10 is formed with a depending arm 13 which has on its outer end the fixed member 14 of the clamp, the removable member of the clamp being indicated by the numeral 15. The elements constituting the clamp have their edges formed with outstanding ears so that after the clamp is arranged around the steering post column 3 the removable section 15 thereof may be compressed against the fixed section 14 by the adjustable and removable securing means 16 for the clamp sections. In this manner it will be seen that the body of the heating device may be properly arranged for contacting engagement with the inner face of the windshield.

The flexible pipe 11 is designed to be connected to the exhaust manifold for the engine of the automobile 1, and the passage through this pipe is controlled by a hand operated valve 17. The pipe 12 is directed to the atmosphere.

The heat let into the hollow body 4 may be readily regulated by adjusting the valve 17 and, of course, by closing this valve the heat is prevented from entering the valve. By providing the baffle plates in the body the heat will be circulated entirely therethrough before finding an exit through the pipe 10 and by providing the inner face of the body with the corrugations heated air will be directed and circulated over the entire face of the windshield so that accumulations of frost on the said windshield will be thus effectively prevented and the driver of the vehicle will have clear vision of the conditions ahead.

In Figure 7 the construction is substantially similar to that previously described, except that the body 4' is not provided with the baffle plates 7 and 8 and there is arranged in the body 4' and connected to the end walls thereof a heater coil 18 wired to a suitable source of electricity 19 and the said wires being controlled by a switch 20. This type of our improvement is designed for use upon the windshields of street cars and like vehicles.

Having described the invention, we claim:

1. A windshield heater comprising a hollow body having one of its faces corrugated and having compressible strips frictionally received in the end corrugations and extending therethrough for contacting with the inner face of a windshield, means supporting the body, and means for directing heat through the body.

2. A heating device for windshields comprising a hollow body having one of its faces corrugated vertically, compressible strips seated in the end corrugations and designed to contact with the inner face of a windshield, adjustable supporting means for the body, a removable cover plate for the inner face of the body, vertical and horizontal baffle plates in the body, valve controlled means for directing heat into the body adjacent one side of the lower vertical baffle plate and means adjacent to the second side of the baffle plate providing an exit for the heat.

In testimony whereof we affix our signatures.

DEVERE D. SAPPENFIELD.
FRED M. SHEETS.